(12) United States Patent
Harry et al.

(10) Patent No.: US 7,779,387 B2
(45) Date of Patent: Aug. 17, 2010

(54) OFFLINE SOURCE CODE CONTROL

(75) Inventors: Brian D Harry, Chapel Hill, NC (US);
Douglas T Neumann, Cary, NC (US);
Justin E Pinnix, Raleigh, NC (US)

(73) Assignee: Microsoft Corporation, Redmond, WA (US)

( * ) Notice: Subject to any disclaimer, the term of this patent is extended or adjusted under 35 U.S.C. 154(b) by 957 days.

(21) Appl. No.: 10/824,969

(22) Filed: Apr. 15, 2004

(65) Prior Publication Data

US 2005/0235012 A1  Oct. 20, 2005

(51) Int. Cl.
*G06F 9/44* (2006.01)
*G06F 7/00* (2006.01)

(52) U.S. Cl. ............... 717/113; 717/103; 717/109; 717/111; 707/607; 707/608; 707/653; 707/704

(58) Field of Classification Search .............. 717/110, 717/120, 122
See application file for complete search history.

(56) References Cited

U.S. PATENT DOCUMENTS

| | | | |
|---|---|---|---|
| 6,085,234 A | | 7/2000 | Pitts et al. |
| 6,698,013 B1 * | | 2/2004 | Bertero et al. .............. 717/127 |
| 6,757,705 B1 | | 6/2004 | Pardikar et al. |
| 2002/0078142 A1 | | 6/2002 | Moore et al. |
| 2003/0033590 A1 * | | 2/2003 | Leherbauer ................. 717/122 |
| 2003/0233644 A1 | | 12/2003 | Cohen et al. |
| 2004/0122791 A1 * | | 6/2004 | Sea et al. ........................ 707/1 |
| 2004/0133444 A1 * | | 7/2004 | Defaix et al. ................... 705/1 |
| 2005/0091226 A1 * | | 4/2005 | Lin et al. ..................... 707/100 |
| 2005/0108685 A1 * | | 5/2005 | Ta ............................... 717/120 |

OTHER PUBLICATIONS

Edward Swierk, et al., The Roma Personal Metadata Service, Mobile Networks and Applications, 2002, pp. 407-418, The Netherlands.
Hoang Nguyen Minh, et al., User Profile Replication with Caching for Distributed Location Management in Mobile Communication Networks, SAC 2001, 2001, pp. 381-386, Las Vegas, Nevada, USA.

* cited by examiner

*Primary Examiner*—Chameli C. Das
*Assistant Examiner*—Isaac T Tecklu
(74) *Attorney, Agent, or Firm*—Workman Nydegger (57) ABSTRACT

A source code control architecture. A client user checks out a copy of a source code file to the client using a file checkout process. A client cache maintains a pristine copy of the file, and a client activity list maintains a list of commands executed during the offline mode to effect modifications to the copy. The client cache contains a pristine copy of all source code files that are modified or deleted in a local client workspace. The cache is maintained whether the user is online or offline. When the user is offline, the cache is utilized to facilitate many of the activities that historically would require server connectivity. The command activity list allows a developer to continue changing the source code while offline by automatically recording the executed commands. The offline commands are reconciled to the server, and used to update the server file(s) when the client returns online.

25 Claims, 9 Drawing Sheets

OFFLINE SOURCE CODE CONTROL

TECHNICAL FIELD

This invention is related to software version control systems, and more specifically, to the control of source code when working offline.

BACKGROUND OF THE INVENTION

There are several different data version control mechanisms currently employed by organizations to ensure that data collaboration efforts can be maintained. Conventionally, data in the form of a document, for example, can be checked out of a central repository for editing, and safely uploaded to the repository at a later time, with little impact on the organization. However, offline/online source code control (SCC) can present more costly problems if such control is not exercised more carefully. Organizations involved in software development typically employ a SCC system for managing source code assets being produced by software developers. These systems provide three principal benefits to these organizations by serving as a central repository for storing and securing electronic assets being created in an organization, retaining historical information regarding how electronic assets have evolved over time and provide access to historical versions of these assets, and providing a mechanism for individual developers to share their work with other team members.

In the course of using the system for the third listed benefit, individual contributors frequently work in an offline capacity while disconnected from the central repository. Upon regaining connectivity to the repository, the contributor must reconcile many of the offline changes with the SCC system. However, without a mechanism for tracking changes that are made while offline, the contributor must retrace all activities and manually reconcile changes. Often, this process results in dropped changes that do not get reconciled until another user encounters a problem working with the source code, and traces issues back to the original contributor.

What is needed is an improved control mechanism for tracking source code changes while offline.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention disclosed and claimed herein, in one aspect thereof, comprises an improved source code control system when developers are working offline from a server system that includes a file repository. The invention facilitates at least four principal functions for offline source code control. A client workspace is established when a client user issues a command to the server to download one or more files from the server repository. All file changes are made in the client workspace after the client has checked out the file during either of the online or offline modes. This provides a mechanism whereby other users are made aware that the file is potentially being modified by another user. The repository tracks the state information, which information includes whether the file is checked out from the server, checked back in to the server, and locked on the server, for example. When the user then chooses to checkout a file from the workspace for editing, a corresponding command is issued, and a pristine version of that file is cached. The checkout process can be performed during both of the online and offline modes, initiating caching in both modes.

The user then moves to an offline state for any number of reasons, including a server failure and the user choosing to disconnect from the server (e.g., to travel). In order to enter offline mode, the user issues a corresponding command. The offline-type command causes all command activities to be recorded in an activity list. Thus, when offline, and the checkout command is issued, the pristine copy is cached in support of all offline command activities that require the presence of an unmodified file copy, to include "undo" and "difference" (or compare) operations, for example.

When moving back to an online mode, the client user issues a corresponding command to make the online connection, and command activities stored in the activities list are uploaded to the server. The commands stored in the activities list are then used to reconcile the offline changes with the server file. However, this must be performed carefully for a number of reasons. In one example, when the client goes offline and the client user then checks out the file, a second user locks the same file on the server, preventing any updates from occurring. Thus, when the client returns to online mode, the offline checkout cannot be reconciled. The first user will be notified with an error message. In another example, the server file was not locked, but is available for update. However, the server file has already gone through a previous update from a third user. Thus, some aspects of the server file are different from the offline updates, while others may be the same. As with any case, the activities list is used to reconcile the offline changes with the server file. When returning online, the commands executed during the offline state (and stored in the activities list) are transmitted to the server, and processed one-at-a-time to facilitate updating the server file. The reconciliation process includes ensuring that each offline command can be applied to the server file. If so, once reconciliation has completed, the checked out file can be checked in to the server. If some offline command activities cannot be reconciled, the system issues a message to the user to resolve the conflict, which resolution can be to delete the activity, since it has already been performed by another user, for example. Once all conflict errors have been addressed by the user, the file can be checked back in to the repository, establishing a new file version for central access.

In another aspect of the present invention, a classifier provides automation of certain features based on inferences made related online and/or offline processes.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention can be practiced without these specific details. In other instances, well-known structures and devices are shown in block diagram form in order to facilitate describing the present invention.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
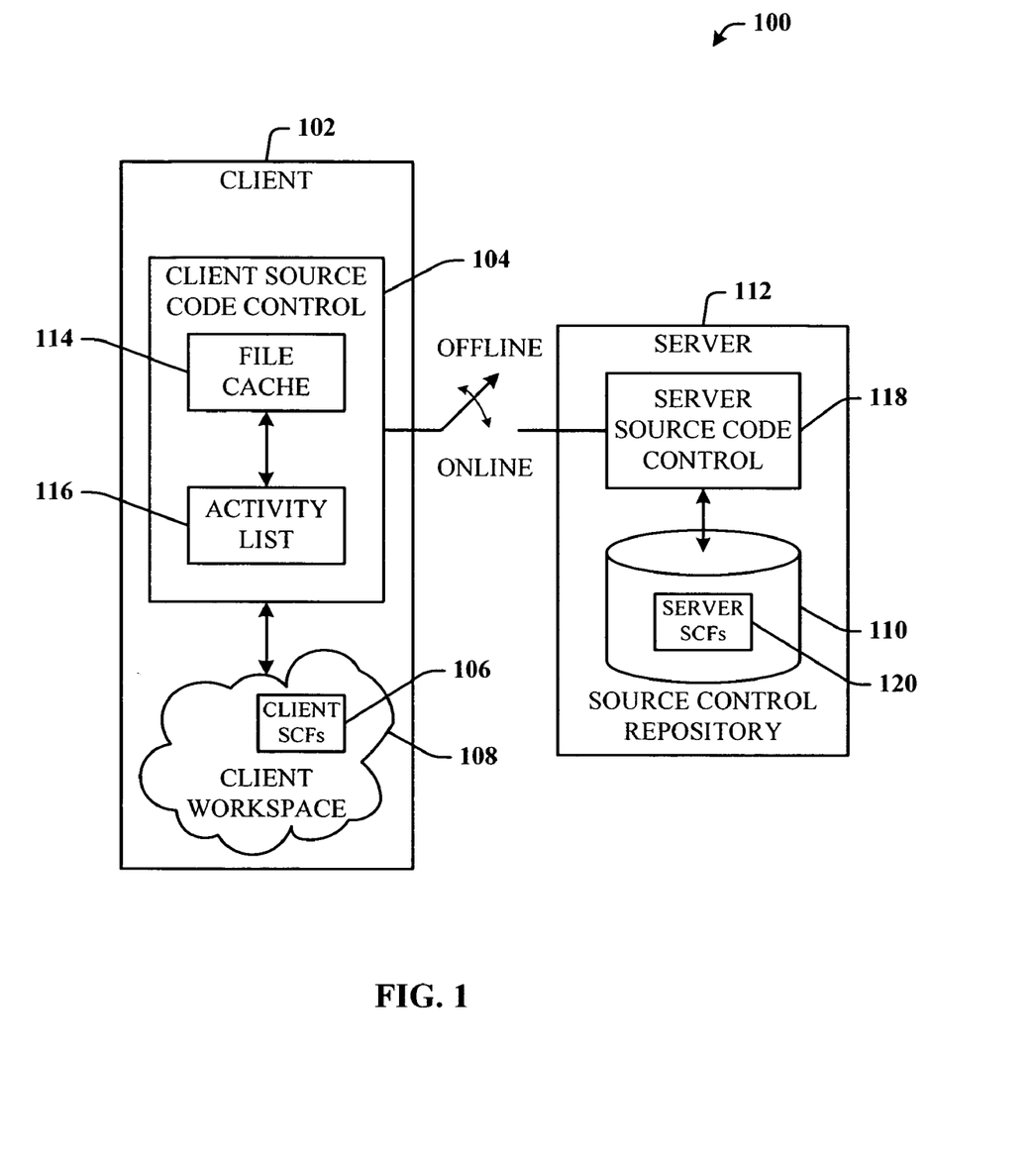
FIG. 1 illustrates one implementation of a source code control (SCC) system of the present invention.

Referring now to FIG. 1, there is illustrated one implementation of a source code control (SCC) system 100 of the present invention. The system 100 includes a client SCC component 102 hosted on a client 104 that facilitates changing at least one source code file (SCF) 106 in a client workspace 108 during an offline state, and migrating such changes to a source control repository 110 of a server 112 when the client 102 moves to an online state. In support thereof, the client SCC 104 includes a file cache 114 that caches unmodified source code files, and an activity list 116 that stores commands that were executed during the offline period and facilitates reconciliation of the activities with the server when the client returns online. The activity list 116 is not required to store the activities in any sequential or chronological manner; however, this can be done, if desired. The file cache 114 also caches sufficient information to facilitate other useful processes, for example, an "undo" process and a "compare" (or difference) process, if needed.

The file cache 114 contains a pristine copy of all source code files that are checked out in the local client workspace 108. This caching process at the client also occurs during online mode if the user checks out a file from the repository while online. The cache contents are maintained whether the user is online (has connectivity to the server 112) or offline (is disconnected form the server 112). When the user is offline, the cache 114 can be utilized to support many of the user and modification activities that historically would require server connectivity. The activity list 116 allows a developer to continue recording commands that facilitate changing source code files while offline. Commands are stored persistently and then transmitted to the server 112 when the client returns online. The server 112 includes a server SCC component 118 that interfaces to the client SCC component 104 to facilitate the transfer of the commands and update of the current server-side source code files 120 in the server repository 110.

More specifically, the invention facilitates at least four principal functions for offline source code control. A client workspace is established when a client user issues a command to the server to download one or more files from the server repository. All file changes are made in the client workspace after the client has checked out the file, which checkout can occur during both the online and offline modes. The checkout process provides a mechanism whereby other users are made aware that the file is potentially being modified by another user. The repository tracks the state information, which information includes whether the file is checked out, checked in, and locked, for example. When the user then chooses to checkout a file from the workspace for editing, a corresponding command is issued, and a pristine version of that file is cached. The checkout process can be performed during both of the online and offline modes, initiating caching in either mode.

In order to enter offline mode, the user issues a corresponding command. The offline-type command causes all executed commands to be recorded in an activity list. Thus, if the client user had downloaded the desired copies of the server source code files to the client without checking the documents out from the server, when offline, the checkout command can be issued, and the pristine copy is cached in support of all offline activities that require the presence of an unmodified file copy, to include "undo" and "difference" (or compare) operations, for example. Note that in another implementation, the download of one or more source code files to the client can include a single operation that downloads the files and performs the checkout process in a single operation.

When moving back to an online mode, the client user issues a corresponding command to make the online connection, and command activities stored in the activities are transmitted for reconciliation to the server. The commands stored in the activities list are then used to reconcile the offline changes with the server file. However, this must be performed carefully for a number of reasons. In the above example, the user downloaded the server file copies without performing a checkout operation. The client then when offline. The user then checked one or more of the files out of the client workspace for modification. This offline checkout operation then needs to be reconciled (or reapplied) with the server when the client returns online, as well as, any commands that were executed during the offline checkout activity. In another example, when the user downloads the file(s) (without checkout) to the client, then goes offline, and the client user then checks out the file, a second user locks the same file on the server, preventing any updates from occurring. Thus, when the client returns to online mode, the offline checkout cannot be reconciled. The first user will be notified with an error message. In still another example, the server file was not locked, but is available for update. However, the server file has already gone through a previous update from a third user. Thus, some aspects of the server file are different from the offline updates, while others may be the same. As with any case, the activities list of commands is used to reconcile the offline changes with the server file. When returning online, the commands executed during the offline state (and stored in the activities list) are transmitted to the server, and processed one-at-a-time to facilitate updating the server file. The reconciliation process includes ensuring that each offline command can be applied to the server file. If so, once reconciliation has completed, the checked out file can be checked in to the server. If some offline command activities cannot be reconciled, the system issues a message to the user to resolve the conflict, which resolution can be to delete the activity, since it has already been performed by another user, for example. Once all conflict errors have been addressed by the user, the file can be checked back in to the repository, establishing a new file version for central access.

Figure 2:
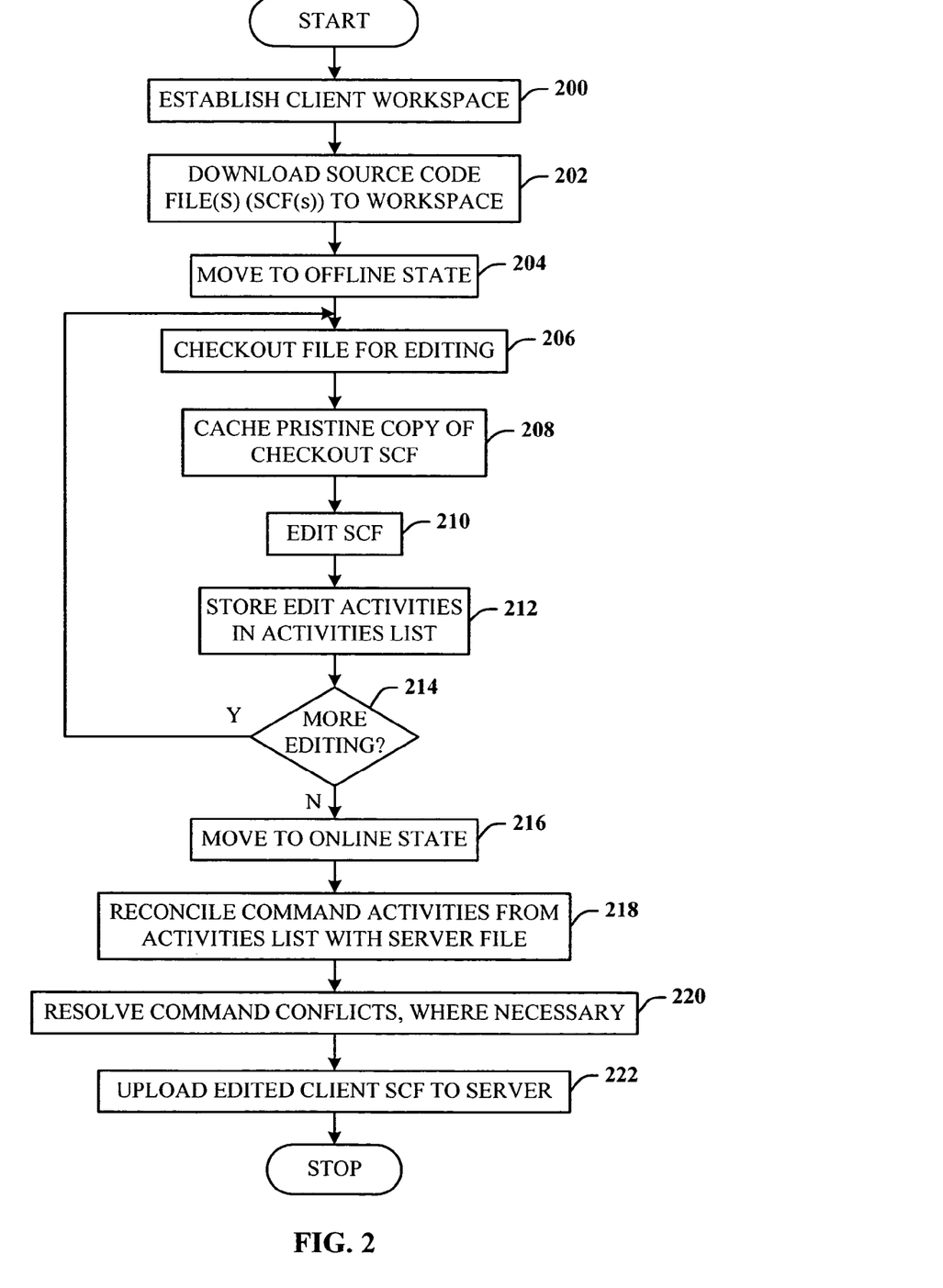
FIG. 2 illustrates a flow chart of one process of offline source code control in accordance with the present invention.

Referring now to FIG. 2, there is illustrated a flow chart of one process of offline source code control in accordance with the present invention. While, for purposes of simplicity of explanation, the one or more methodologies shown herein, e.g., in the form of a flow chart, are shown and described as a series of acts, it is to be understood and appreciated that the present invention is not limited by the order of acts, as some acts may, in accordance with the present invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

At 200, a client workspace is established. At 202, one or more server source code files(s) (SCF(s)) are downloaded to the client workspace in accordance with the file checkout process. At 204, the user then moves the client to an offline state. At 206, the user checks out the SCF from the workspace while offline, in preparation for making offline modifications thereto. At 208, in response to the checkout process, a pristine copy of the SCF is cached. At 210, modifications are made to the SCF. At 212, commands that are executed offline are stored in a client activities list. At 214, the user decides if more SCFs are to be edited. If Yes, flow is back to 206 to checkout the next file and continue the process. If the user chooses to not edit any additional files, flow is to 216 to return to the online state. This is user initiated by a corresponding online-related command. At 218, a reconciliation process is initiated to reconcile file offline command activities stored in the client activities file with the server. At 220, the user must resolve any conflicts that occur during the reconciliation process. Once all commands have been reconciled, the offline file can be uploaded to the server repository where a new file version is created for central access, as indicated at 222. The process then reaches a Stop block.

Figure 3:
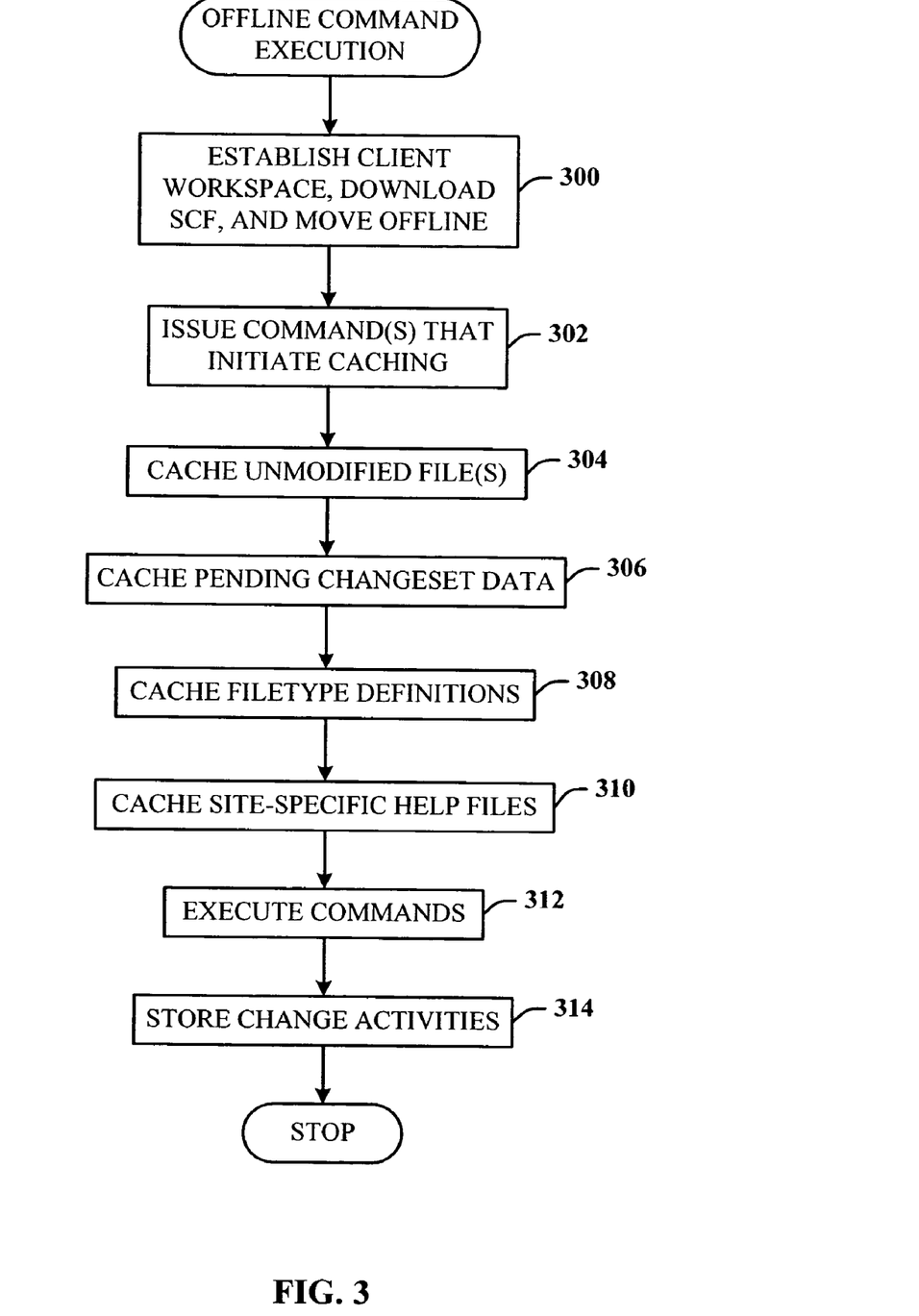
FIG. 3 illustrates a flow chart of one specific command implementation of offline command execution in accordance with the present invention.

Referring now to FIG. 3, there is illustrated a flow chart of one specific command implementation of offline command execution in accordance with the present invention. At 300, the client workspace is established, one or more SCFs are downloaded, and the client is taken offline. At 302, one or more commands can be executed separately or in combination while disconnected from the server to initiate file caching on the client. For example, Checkout, rename, and delete commands initiate or require the storage of a pristine file version at the client. The pristine file(s) are necessary to be able to perform the "undo" operation and to perform the "difference" or "compare" operation, for example. These commands initiate storage of the files regardless of whether or not the system is currently in offline mode. Moreover, in order for these and other commands to work properly, a number of items are cached to the local disk. This includes not only the caching of unmodified source code files, as indicated at 304, but other information, as well. At 306, pending changeset data is a cached. Additionally, information about what changes are pending is stored locally in the activities list. Otherwise, the offline checkout and undo commands cannot work properly because they do not know the state of local changes. At 308, filetype definitions are cached. The add command requires access to the system filetype definitions. These must be cached locally for offline add commands to work correctly. The difference command also uses this information to determine which difference engine to use. The commands that interface with the server update this information when necessary. At 310, additional information that the client usually obtains from the server that it needs can be cached. For example, site-specific help files can be cached locally. A help command can display site-specific help information. The get and offline commands update this information when necessary. At 312, the developer executes commands against the source code of the files. At 314, the command activities are stored in the activity list. The process then reaches a Stop block.

Security

Figure 4:
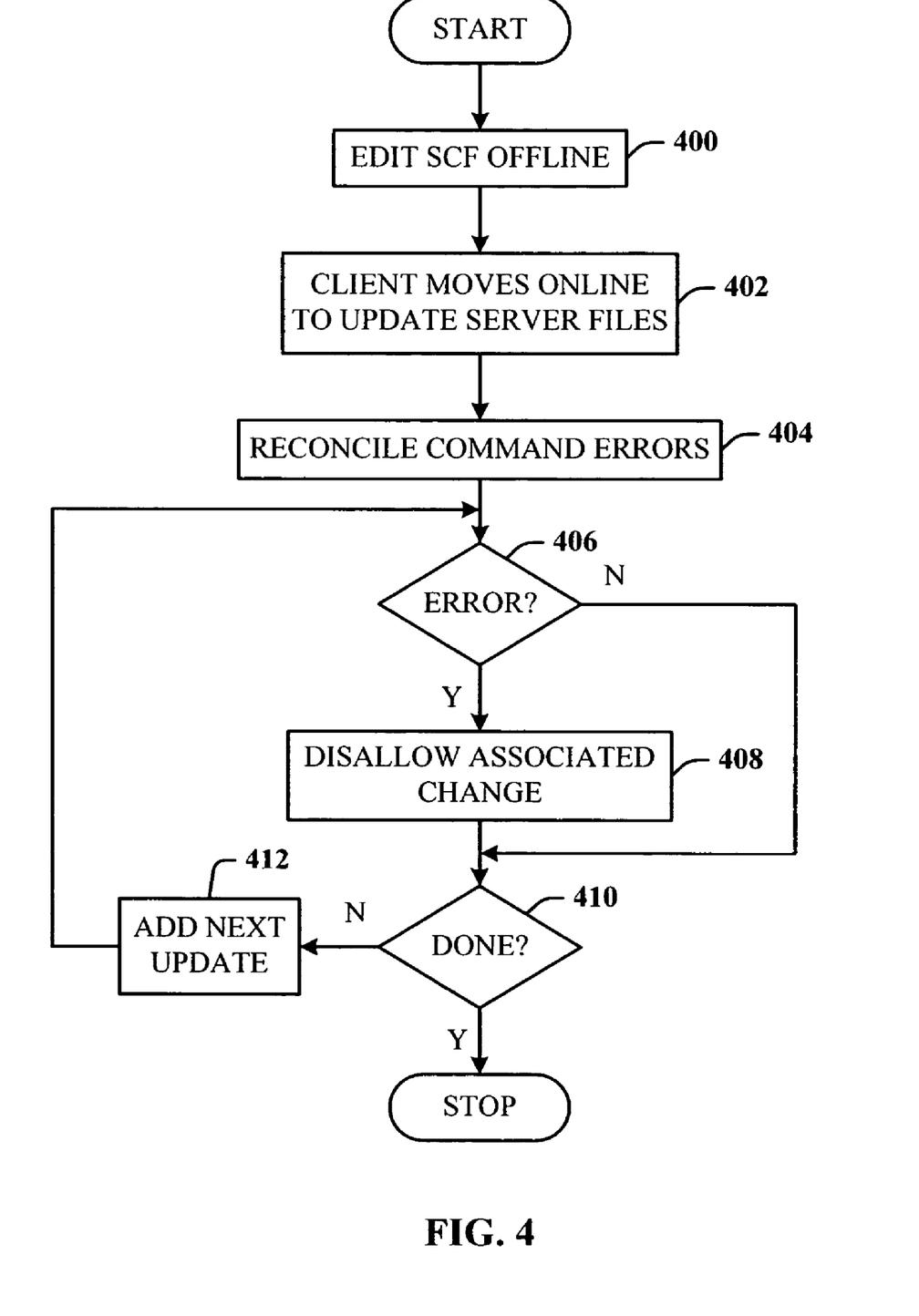
FIG. 4 illustrates a flow chart for one process that addresses offline file security.

Referring now to FIG. 4, there is illustrated a flow chart for one process that addresses offline file security. Offline file security can also be an issue. Enforcing read rules is relatively easy because none of the offline commands can retrieve any information from the server. Write rules and locks cannot be accurately enforced, since they are not downloaded to the local cache. However, if such commands are performed offline, they may have a "delayed failure" that is not detected until the user goes online. This is acceptable, and is the model for enforcing offline security. The "unsecure" changes will not be allowed to be committed. At 400, the developer edits an SCF offline. At 402, the client moves online to update the server files. At 404, a check for errors is made during the update process. At 406, the system determines if an error has been found. If Yes, at 408, the associated update is not allowed. At 410, the system determines if the update process has completed. If Yes, flow is to a Stop block.

If, at 410, the update process has not completed, flow is to 412 to add the next update, and then to 406 to again, check for an error. This process continues until no further updates can be made. Of course, if no errors are detected, flow is from 406 to 410 to determine if the update process has completed. It is to be appreciated that the occurrence of a single error can cause total failure of the update process. In another implementation, the type of error is examined, after which a determination is made whether to abort the update, or continue with a limited update process.

Consistency

Figure 5:
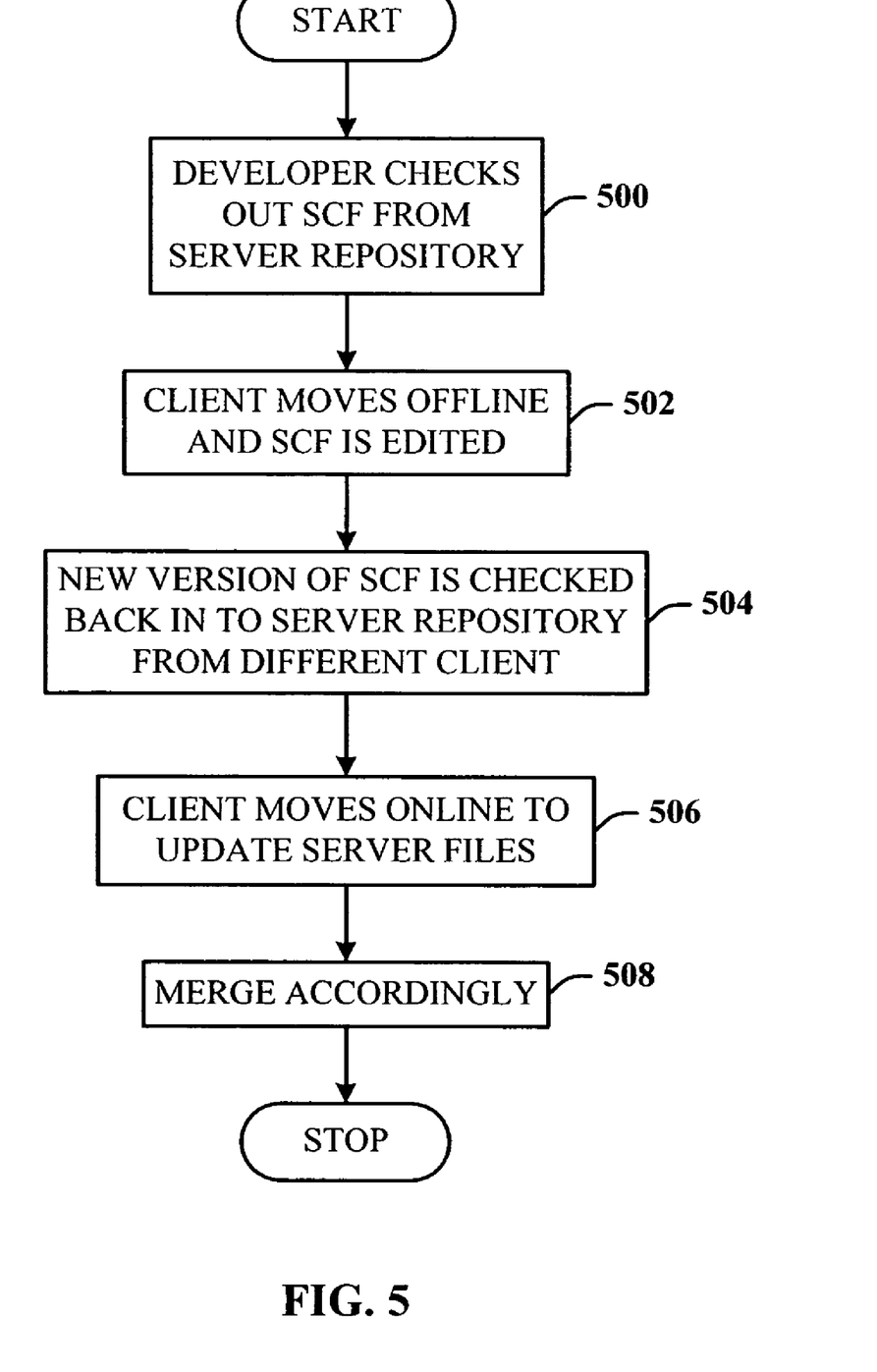
FIG. 5 illustrates a flow chart for one process where updates to the server file(s) are made after the client goes offline.

Referring now to FIG. 5, there is illustrated a flow chart for one process where updates to the server file(s) are made after the client goes offline. There are cases where data can be downloaded for offline use and thereafter, the same server file is modified on the server while the checked out version is being modified offline on the client. Most of these cases can be resolved easily. If a new file version is checked in to the server repository by another user while the client version is being edited, the conflict can be resolved using normal merge techniques. At 500, the developer (user) of the first client checks out an SCF from the server repository. At 502, the first client moves to an offline state. At 504, a new version of the checked out file(s) is checked back in to the server repository from a different client. At 506, the first client moves to an online state and submits its changes. Since the checkout command always checks out the version that is in the repository (as opposed to the latest version), this behavior is consistent with online mode. At 508, the versions are merged accordingly. The process then reaches a Stop block.

Figure 6:
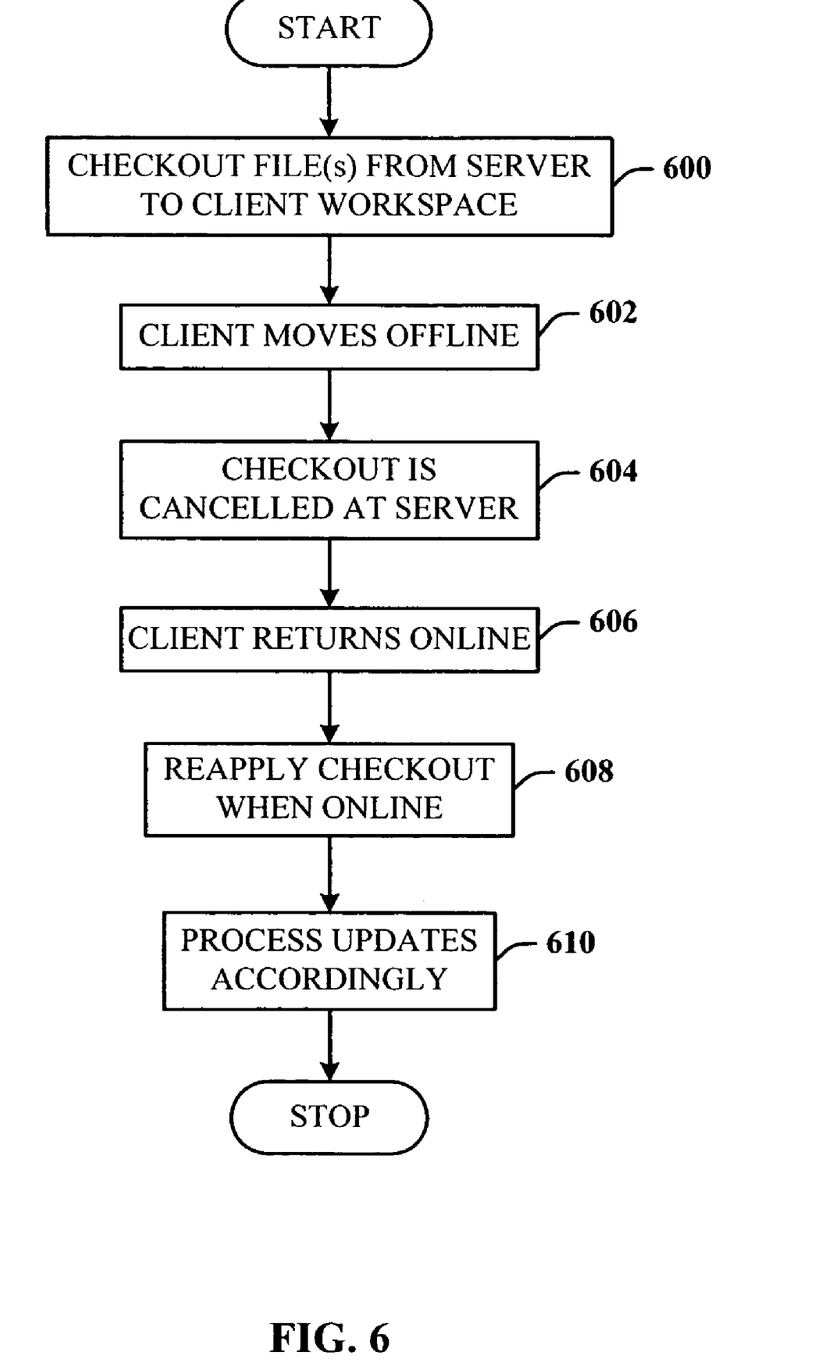
FIG. 6 illustrates a flow chart of a process where a file checkout is cancelled at the server while the client is offline.

Referring now to FIG. 6, there is illustrated a flow chart of a process where a file checkout is cancelled at the server while the client is offline. In the online case, though the file checkout is initiated on the client machine by a first user where the working copy of the file lives, the checkout state information is still tracked in the server. This allows other users to see who made the checkout and makes workspace synchronization more efficient. It is appreciated that an administrator of the server can cancel the checkout at the server. This will not cause any immediate changes on the client machine, but the client will not be permitted to check in the file without reapplying the checkout.

Additionally, when a file checkout is performed, the user can specify that the server version of the file be locked in the server. There are two types of locks: a checkin lock and a checkout lock. A checkin lock allows the other users to check out the same file, but they may not check the file back in until the lock is released. A checkout lock prevents the other users from even checking out the file in the first place. The checkout lock is released when the first user who established the lock, checks in the file, undoes the checkout, or explicitly releases it. For a given file, only one user at a time can own a lock, regardless of its type. Note that if the first user requested a file lock during offline checkout, the server has no knowledge of this offline lock, but will attempt to grant the lock when the client returns online. Additionally, if the user had requested a lock during online checkout, and the server checkout and lock was cancelled after the client went offline, the checkout that is reapplied to the server will not have a lock associated with it.

In the offline case, if the first user performs a checkout while offline, the server is not notified of the checkout until the client returns online. In this case, the checkout is reapplied, and the updates are processed normally according to the present invention. Thus, at 600, the first user checks out one or more SCFs from the server to the client workspace. At 602, the client moves offline. At 604, the checkout is cancelled at the server, perhaps by the server administrator. At 606, the client returns online. At this point, at least three choices can be processed: throw away all of the changes the user made while offline; reapply the user checkout; or error out. Reapplication of the checkout is performed, because it minimizes the possibility of losing work. At 608, the checkout is reapplied to the server. At 610, the offline commands executed are processed to update the server files according to the present invention. The process then reaches a Stop block.

Commands-Offline

The offline command is used to switch the client into offline mode.

Command Line

| offline [/repository:url] [/workspace:ws] [/status] |   |
|---|---|
| /repository | URL of repository containing workspace. |
| /workspace | Name of workspace. Not required if command is executed inside of workspace's working directories. |
| /status | Reports whether or not workspace is online. |

Examples

| offline | Switches the workspace to offline mode. |
|---|---|
| offline /status | Indicates whether the workspace is in offline mode. |

Description

The offline command places the workspace in offline mode. No subsequent commands will attempt to connect to the repository until the online command is executed. Any commands that require online mode will fail.

Offline Usage

This command may be used when disconnected. This is desirable because users can forget to go offline before leaving the office, for example. This means that each offline-capable command must store the necessary information it needs in the local client before disconnection.

If this command is executed while still connected, this command will create/update a local cache of filetype definitions from the server. This cache is used for other commands executed in offline mode, such as the add or difference commands.

This command can only be executed on the computer in which the workspace resides. The user must have permission to the workspace's offline data store.

Error Conditions

A warning is generated if the client workspace is already offline.

Exit Codes

0 Switched to offline mode and was able to contact server to update caches.

1 Switched to offline mode, but server was not available. Caches may possibly be out of date.

100 An error occurred

Security Considerations

No permissions are required for this command. It makes no changes to the server and exposes no new data.

Commands-Online

The online command submits all offline changes to the server.

Command Line

| online [/repository:url] [/workspace:ws] [/status] [/no] |   |
|---|---|
| /repository | URL of repository containing workspace. |
| /workspace | Name of workspace. Not required if command is executed inside of workspace's working directories. |
| /status | Reports whether or not workspace is online. |
| /no | Reports what would happen if client were to go online. |

Examples

| | |
|---|---|
| online | Switches the workspace to online mode. |
| online /status | Indicates whether the workspace is in online mode. |

Description

The online command is used to apply changes made in offline mode to the server. This does not cause any changes to be checked in. Instead, it simply updates the workspace's checkout records.

Error Conditions

This command reports any warnings that would have ordinarily resulted from any of the offline changeset changes had they been made in online mode.

If any offline operations result in errors (such as an offline edit of a locked file), the error is displayed, and the workspace is left in offline mode. The user must rectify the problem and rerun the online command to go online.

| Exit Codes |  |
|---|---|
| 0 | Switched to online mode. |
| 1 | Conflicts occurred that prevented the workspace from coming online (locked files, etc.). |
| 100 | An error occurred. |

Security Considerations

The user must have all of the appropriate permissions required for the changes that were made offline. This is the first opportunity to verify permissions for such changes.

Automation of SCC Features

Figure 7:
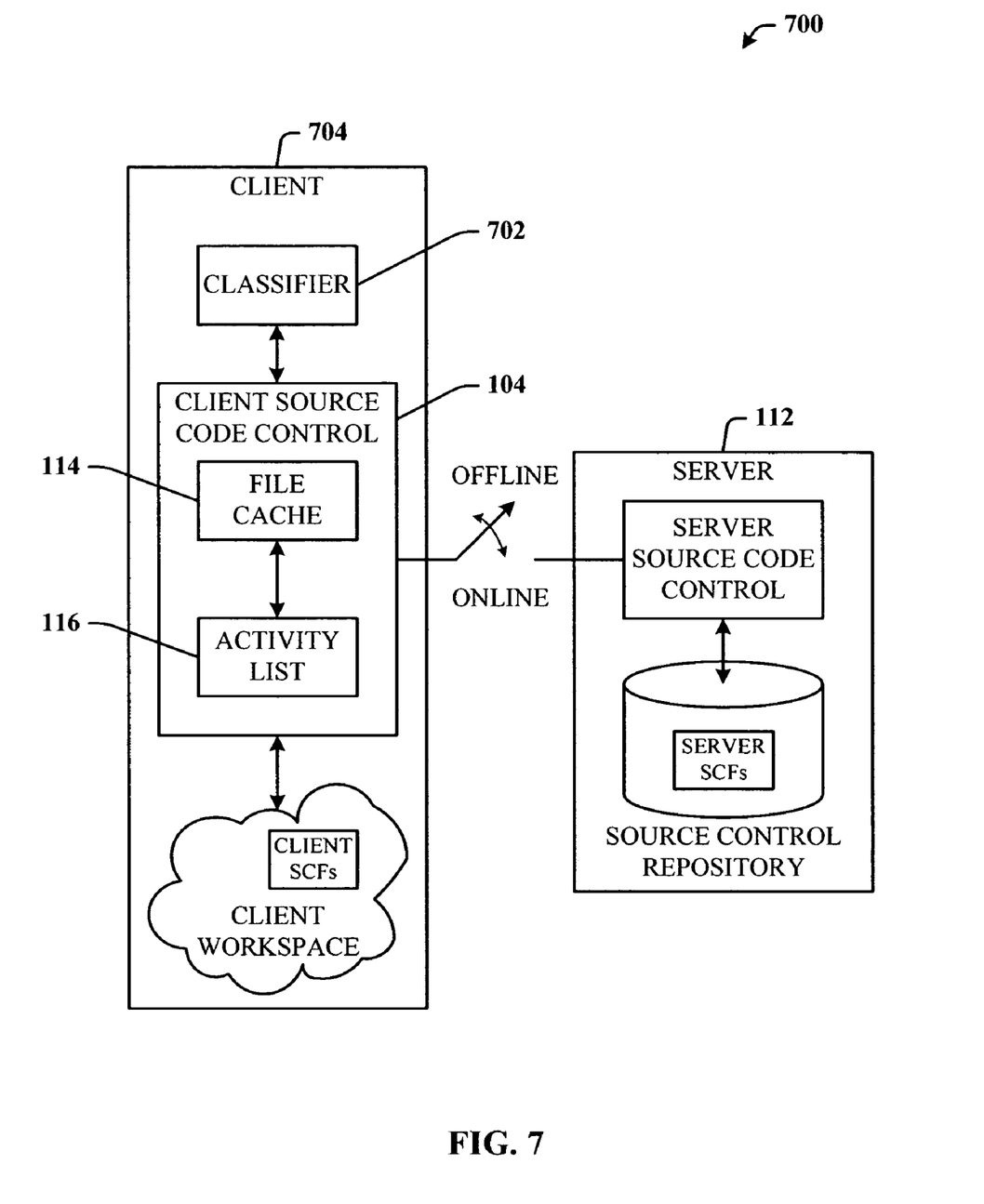
FIG. 7 illustrates a system that employs artificial intelligence in accordance with the present invention.

Referring now to FIG. 7, there is illustrated a system 700 that employs artificial intelligence in accordance with the present invention. The subject invention (e.g., in connection with selection) can employ various artificial intelligence based schemes for carrying out various aspects of the subject invention. For example, a process for determining if to continue an update process based on the number and/or type of update errors that occur can be facilitated via an automatic classifier system and process 702.

The system 700 includes a client 704 that comprises the client SCC 104 and the classifier 702. The classifier 702 interfaces to the SCC 104 to make one or more inferences based on data analyzed from the offline/online source code control processes.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naive Bayes, Bayesian networks, decision trees, and probabilistic classification models providing different patterns of independence can be employed. Classification as used herein also is inclusive of statistical regression that is utilized to develop models of priority.

As will be readily appreciated from the subject specification, the subject invention can employ classifiers that are explicitly trained (e.g., via a generic training data) as well as implicitly trained (e.g., via observing user behavior, receiving extrinsic information). For example, SVM's are configured via a learning or training phase within a classifier constructor and feature selection module. Thus, the classifier 702 can be used to automatically perform a number of functions, including but not limited to determining according to a predetermined criteria if an error will occur based on the developer changes that have been made and enqueued in the activity queue 116, and what files to cache in the file cache 114 based on the developer. For example, if the developer is one who routinely deals only with a given set of SCFs, the classifier 702 can be employed to check the developer login data, and automatically move those files to the cache 114. The classifier 702 can also be used to learn developer techniques for editing a given type of source file, and then predict the next change for the developer. Additionally, the number and type of errors detected when updating to the server 112 can be analyzed according to a predetermined threshold, one that can now move dynamically based the learning capabilities of the classifier 702, and on a given developer, file type, impact of the particular file on the overall resulting program, etc. Thus, if the number of errors exceeds four, for example, the update will be stopped, and the developer alerted that the errors must be reduced. Where the number of offline edits become large, the classifier 702 can be employed to warn the developer that further offline work should be minimized for a given file or prohibit the developer from any further modifications. This can also be based on the size of the queue, and the time that would be required to make the online update, and the complexity of making the update based on the file, file language, and so on. These are just a few analyses and automated features that the classifier 702 can make.

Figure 8:
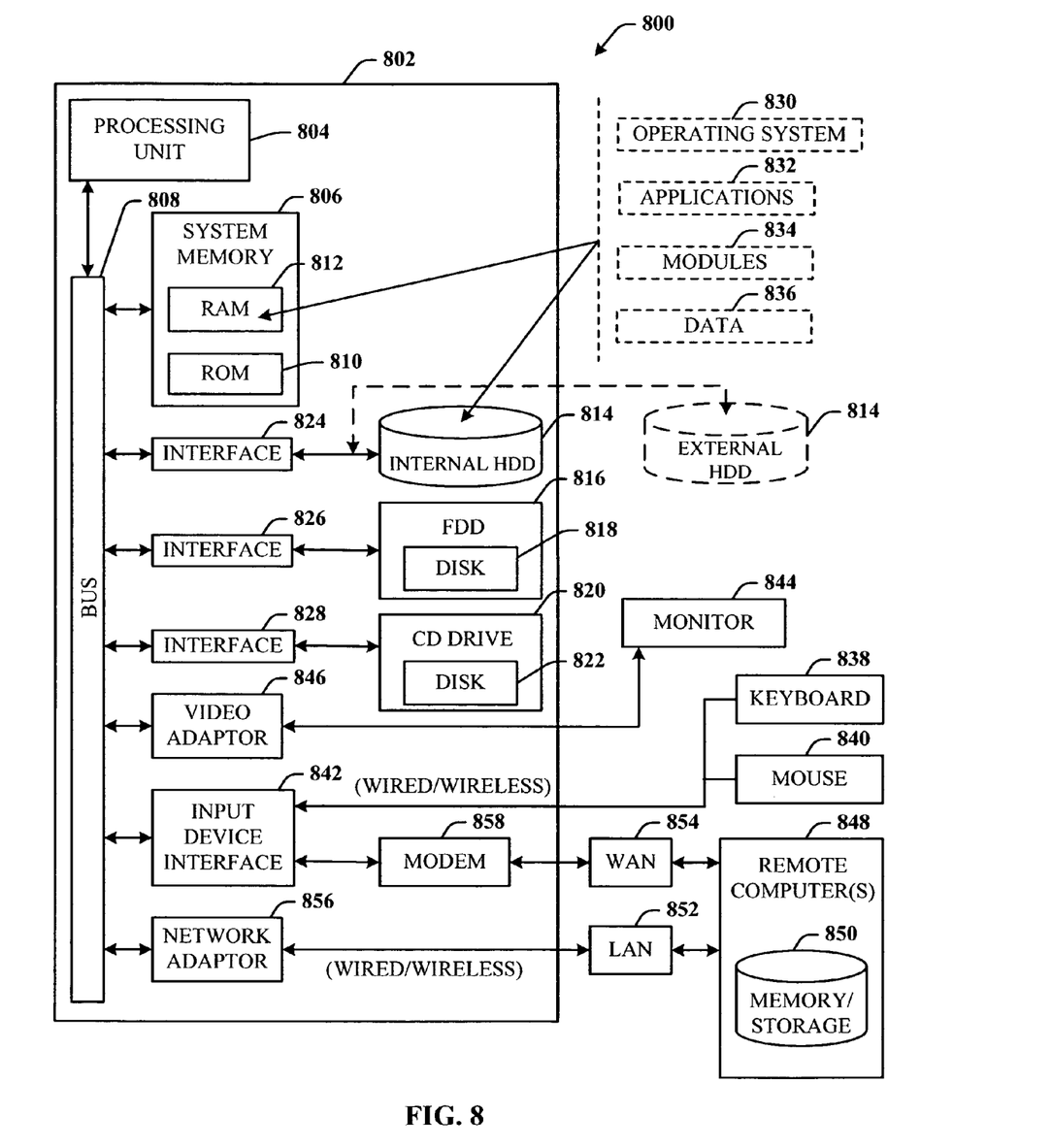
FIG. 8 illustrates a block diagram of a computer operable to execute the disclosed architecture.

Referring now to FIG. 8, there is illustrated a block diagram of a computer operable to execute the disclosed architecture. In order to provide additional context for various aspects of the present invention, FIG. 8 and the following discussion are intended to provide a brief, general description of a suitable computing environment 800 in which the various aspects of the present invention can be implemented. While the invention has been described above in the general context of computer-executable instructions that may run on one or more computers, those skilled in the art will recognize that the invention also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the invention may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer readable media can comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, there is illustrated an exemplary environment 800 for implementing various aspects of the invention that includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the present invention.

A number of program modules can be stored in the drives and RAM 812, including an operating system 830, one or more application programs 832, other program modules 834 and program data 836. All or portions of the operating system, applications, modules, and/or data can also be cached in the RAM 812.

It is appreciated that the present invention can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices, and companies, and facilitate enterprise-wide computer networks, such as intranets, all of which may connect to a global communication network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856. When used in a WAN networking environment, the computer 802 can include a modem 858, or is connected to a communications server on the LAN, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with conventional network or simply an ad hoc communication between at least two devices.

Wi-Fi, or Wireless Fidelity, allows connection to the Internet from a couch at home, a bed in a hotel room or a conference room at work, without wires. Wi-Fi is a wireless technology like a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, with an 11 Mbps (802.11b) or 54 Mbps (802.11a) data rate or with products that contain both bands (dual band), so the networks can provide real-world performance similar to the basic 10BaseT wired Ethernet networks used in many offices.

Figure 9:
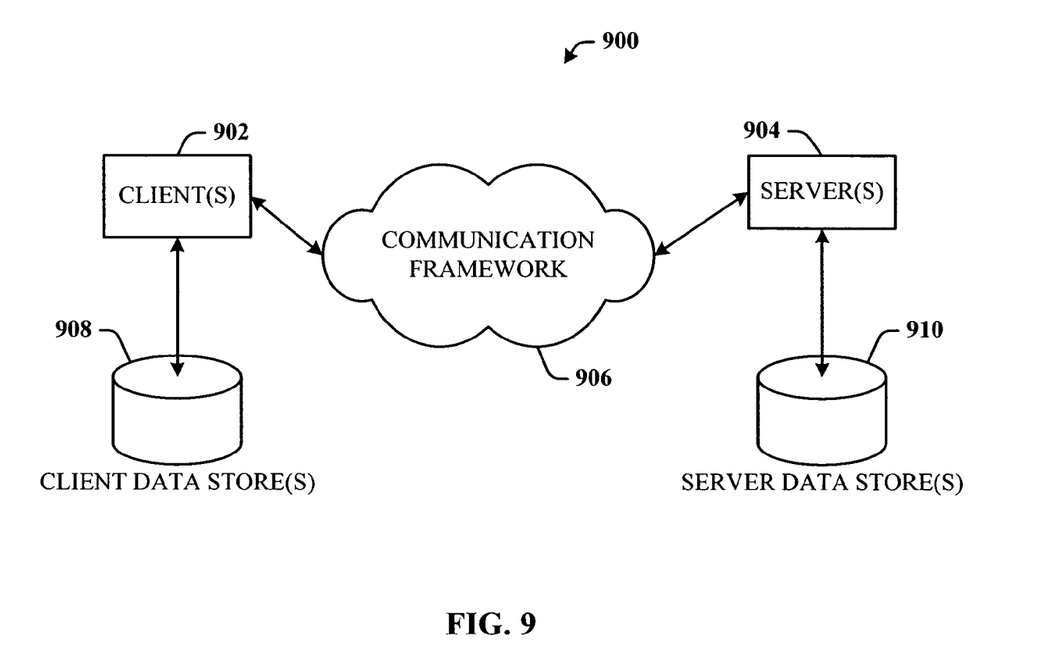
FIG. 9 illustrates a schematic block diagram of an exemplary computing environment in accordance with the present invention.

Referring now to FIG. 9, there is illustrated a schematic block diagram of an exemplary computing environment 900 in accordance with the present invention. The system 900 includes one or more client(s) 902. The client(s) 902 can be hardware and/or software (e.g., threads, processes, computing devices). The client(s) 902 can house cookie(s) and/or associated contextual information by employing the present invention, for example. The system 900 also includes one or more server(s) 904. The server(s) 904 can also be hardware and/or software (e.g., threads, processes, computing devices). The servers 904 can house threads to perform transformations by employing the present invention, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A client system that facilitates source code control, comprising:
    a processor; and
    one or more physical computer readable storage media operatively coupled to the processor, the computer-readable storage media having stored thereon computer executable instructions that, when executed by the processor, are configured to implement the client system, including:
        a client-side client workspace that stores at least one source code file downloaded from a server-side source control repository that maintains state information for one or more source code files stored in the repository, the client workspace enabling a user of the client system to checkout the source code file for modification by the user and to store the source code file when modified;
        a client-side client source code control component that tracks an activity associated with a modification of the source code file in the client workspace when the client is in an offline mode, and that transmits the activity during an update process when the client moves to an online mode, the client source code control component comprising:
            a file cache that stores a pristine copy of the source code file in an unmodified state in response to the source code file being checked out for modification from the client-side client workspace; and
            an activity list that stores the activity, the activity comprising one or more commands executed against the source code file during the offline mode and associated with the modification; and
        wherein the client-side client source code control component is configured to interface with a server-side server source code control component to facilitate transfer of the activity and update of the source code file to the server-side source control repository,
    wherein one of the client-side client source code control component or the server-side server source code control component checks for an error during the update process and determines whether the update can proceed or must be aborted in part or whole.

2. The client system of claim 1, wherein the source code file stored in the file cache remains in an unmodified state.

3. The client system of claim 1, wherein contents of the file cache are maintained in both the offline mode and online mode of the client.

4. The client system of claim 1, wherein the client workspace stores all source code files that have been at least one of modified and deleted.

5. The client system of claim 1, wherein the client downloads the source code file from the server-side source control repository before the client moves to the offline mode.

6. The client system of claim 1, wherein the file cache also stores at least one of pending change set data, a file type definition, and a site-specific help file.

7. The client system of claim 1, wherein an error is resolved during a reconciliation process of the activity to the source code file before the source code file can be updated with the modification.

8. The client system of claim 1, wherein the source code file is downloaded into the client workspace before the client moves to the offline mode.

9. The client system of claim 1, wherein a pristine copy of the source code file is automatically loaded into a client file cache in response to a checkout-related command being executed.

10. The client system of claim 1, wherein the activity list stores the activity in an arbitrary order which need not be sequential, such that the client checks the activity list for an error during the update process and determines whether to transmit the activity list when the client moves to the online mode or to abort a part or all of the update process.

11. The client system of claim 1, wherein the source code file stored in the file cache remains in an unmodified state, and is a file that has been at least one of modified and deleted in the client workspace.

12. The client system of claim 1, wherein the source code file is stored in the file cache of the client during a checkout process that is executed when the client is in one of the offline mode and the online mode.

13. The client system of claim 1, wherein the activity is persisted to a server to update a server source code file associated with the source code file during an update process associated with the online mode.

14. The client system of claim 1, further comprising a classifier that automates a source code control feature by making an inference based on data associated with at least one of the online mode and the offline mode.

15. In a network comprising a client system that facilitates course code control, a computer program product for implementing a method of tracking and reconciling offline file editing and enforcing file security, the computer program product comprising one or more physical computer-readable storage media having stored thereon computer-executable instructions that, when executed by a processor, cause the client system to perform the following:
    establishing a client workspace to store a plurality of source code files, the client workspace established to allow a user of the client to checkout a source code file for modification by the user and to store the source code file when modified;
    downloading a copy of a remote source code file from a server source code control repository to the client workspace;
    moving the client system to an offline mode;
    executing one or more commands to checkout the source code file in the client workspace for editing by the user, and in response to the checkout commands, caching a pristine copy of the source code file in a client file cache, wherein the pristine copy is usable in the offline mode to facilitate undo and difference processes;
    modifying the source code file in the client workspace by executing one or more commands against the source code file;
    storing activity data in an activity list, which activity data includes the one or more commands executed against the source code file;
    moving the client system to an online mode;
        performing an error check to determine if a security error exists, including:
        determining if the remote source code file is locked; and
        determining if an administrator has disallowed an update process;
    reconciling the activity data with the remote source code file by transmitting the activity data to the server to update the remote source code file if no security error is detected;
    resolving any conflicts that occur during the reconciliation process; and
    uploading the modified source code file to the server source code control repository when any conflicts have been resolved.

16. At a client system that facilitates source code control, a method of tracking and reconciling offline file editing and enforcing file security, the method comprising acts of:
    establishing a client workspace to store a plurality of source code files, the client workspace established to allow a user of the client to checkout a source code file for modification by the user and to store the source code file when modified;
    downloading a copy of a remote source code file from a server source code control repository to the client workspace;
    moving the client system to an offline mode;
    executing one or more commands to checkout the source code file in the client workspace for editing by the user, and in response to the checkout commands, caching a pristine copy of the source code file in a client file cache, wherein the pristine copy is usable in the offline mode to facilitate undo and difference processes;
    modifying the source code file in the client workspace by executing one or more commands against the source code file;
    storing activity data in an activity list, which activity data includes the one or more commands executed against the source code file;
    moving the client system to an online mode;
        performing an error check to determine if a security error exists, including:
        determining if the remote source code file is locked; and
        determining if an administrator has disallowed an update process;
    reconciling the activity data with the remote source code file by transmitting the activity data to the server to update the remote source code file if no security error is detected;
    resolving any conflicts that occur during the reconciliation process; and
    uploading the modified source code file to the server source code control repository when any conflicts have been resolved.

17. The method of claim 16, further comprising storing information at the client before entering the offline mode.

18. The method of claim 16, further comprising updating a checkout record at the server during the online mode.

19. The method of claim 16, further comprising issuing a command to enter the offline mode, and a corresponding command to enter the online mode.

20. The method of claim 16, further comprising issuing a command that includes a URL to a workspace.

21. The method of claim 16, further comprising:
    checking out a source code file during the act of downloading, which is during the online mode.

22. The method of claim 16, further comprising:
    detecting an error during the offline mode;
    presenting an error message associated with the error;
    maintaining the client in the offline mode in response to detecting the error; and allowing the client to move to the online mode after the error has been resolved.

23. The method of claim 16, further comprising imposing permissions required for the offline mode, during the online mode.

24. The method of claim 16, further comprising caching at the client at least one of unmodified files, pending change set information, file type definitions, and site-specific help files.

25. The method of claim 16, further comprising reapplying a checkout process to the server when at least one of a checkout was cancelled at the server when the client was offline and a checkout was performed offline on the client after the source code file was downloaded to the client without the checkout process issued to the server during the online mode.

* * * * *